(12) United States Patent
Kim (10) Patent No.: US 8,654,151 B2
(45) Date of Patent: Feb. 18, 2014

(54) APPARATUS AND METHOD FOR PROVIDING AUGMENTED REALITY USING SYNTHESIZED ENVIRONMENT MAP

(75) Inventor: Chung-Hyun Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 117 days.

(21) Appl. No.: 13/196,753

(22) Filed: Aug. 2, 2011

(65) Prior Publication Data

US 2012/0154425 A1  Jun. 21, 2012

(30) Foreign Application Priority Data

Dec. 17, 2010  (KR) .................. 10-2010-0130284

(51) Int. Cl.
*G09G 5/00*  (2006.01)

(52) U.S. Cl.
USPC ................ 345/633; 345/629; 345/630

(58) Field of Classification Search
None
See application file for complete search history.

(56) References Cited

U.S. PATENT DOCUMENTS

| | | | |
|---|---|---|---|
| 4,675,676 A * | 6/1987 | Takanabe et al. ........ 340/995.15 |
| 5,144,685 A * | 9/1992 | Nasar et al. ................. 382/153 |
| 5,923,334 A * | 7/1999 | Luken ........................... 345/423 |
| 6,031,541 A * | 2/2000 | Lipscomb et al. ............ 345/420 |
| 6,246,417 B1 * | 6/2001 | Kambe et al. ................. 345/619 |
| 6,654,414 B1 * | 11/2003 | Narayanaswami ...... 375/240.01 |
| 7,259,760 B1 * | 8/2007 | Hashimoto et al. ........... 345/419 |
| 2005/0083325 A1 * | 4/2005 | Cho .............................. 345/419 |
| 2005/0131581 A1 * | 6/2005 | Sabe et al. .................... 700/245 |
| 2006/0025888 A1 * | 2/2006 | Gutmann et al. ............. 700/245 |
| 2006/0186702 A1 * | 8/2006 | Kisanuki et al. ......... 296/187.04 |
| 2006/0202985 A1 * | 9/2006 | Kobayashi et al. .......... 345/419 |
| 2006/0224315 A1 * | 10/2006 | Okumura ...................... 701/211 |
| 2006/0241827 A1 * | 10/2006 | Fukuchi et al. ................ 701/23 |
| 2008/0036766 A1 * | 2/2008 | Ishii et al. .................... 345/427 |
| 2008/0086236 A1 * | 4/2008 | Saito et al. ................... 700/245 |
| 2008/0097699 A1 * | 4/2008 | Ono .............................. 701/300 |
| 2011/0102460 A1 * | 5/2011 | Parker .......................... 345/633 |
| 2011/0245974 A1 * | 10/2011 | Kawamoto et al. .......... 700/259 |

FOREIGN PATENT DOCUMENTS

JP  2010-238096  10/2010
KR  10-2010-0085110  7/2010

* cited by examiner

*Primary Examiner* — Jwalant Amin
(74) *Attorney, Agent, or Firm* — H.C. Park & Associates, PLC (57) ABSTRACT

An apparatus and method for providing Augmented Reality (AR) corresponding to objects that are hidden from view of a user. The apparatus includes a first extraction unit to extract a first environment map corresponding to a location of a terminal; a second extraction unit to determine an expanded area enclosing the location of the terminal and to extract a second environment map corresponding to the expanded area; and a synthesization unit to generate a synthesized environment map by synthesizing the first environment map and the second environment map.

23 Claims, 6 Drawing Sheets

APPARATUS AND METHOD FOR PROVIDING AUGMENTED REALITY USING SYNTHESIZED ENVIRONMENT MAP

CROSS-REFERENCE TO RELATED APPLICATION

This application claims priority from and the benefit under 35 U.S.C. §119(a) of Korean Patent Application No. 10-2010-0130284, filed on Dec. 17, 2010, which is incorporated by reference for all purposes as if fully set forth herein.

BACKGROUND

1. Field

The following description relates to an apparatus to provide and a method for providing Augmented Reality (AR), and more specifically, to an apparatus to provide and a method for AR using a synthesized environment map.

2. Discussion of the Background

Augmented Reality (AR) is a computer graphic technique of synthesizing a virtual object or virtual information with a real environment such that the virtual object or virtual information looks like a real object or real information that exists in the real environment.

AR is characterized by synthesizing virtual objects based on a real world to provide additional information that cannot easily be obtained from the real world, unlike existing Virtual Reality (VR) that targets only virtual spaces and virtual objects.

With the widespread use of mobile terminals equipped with cameras, techniques for providing a variety of AR information along with a camera preview image have been developed. For example, in response to an image of a building being captured by a smart phone, various AR information such as the name of the building, a list of shops and offices housed in the building, the locations of restrooms in the building, or the like may be displayed on a screen of the smart phone. In this example, however, only AR information corresponding to objects that can actually be seen from a current location of the user may be provided, and AR information corresponding to objects that cannot be seen from the current location of the user or objects that reside in other locations may not be able to be provided.

To obtain AR information corresponding to objects that cannot be seen from the current location of the user or objects that reside in other locations, the user may need to move to a new location or may be required to additionally manipulate the smart phone, which may result in an increase in network traffic.

SUMMARY

Exemplary embodiments of the present invention provide an apparatus and method for providing AR corresponding to objects that are hidden from view of a user.

Additional features of the invention will be set forth in the description which follows, and in part will be apparent from the description, or may be learned by practice of the invention.

An exemplary embodiment of the present invention provides an apparatus to provide AR, the apparatus including: a first extraction unit to extract a first environment map corresponding to a location of a terminal; a second extraction unit to determine an expanded area enclosing the location of the terminal and to extract a second environment map corresponding to the expanded area; and a synthesization unit to generate a synthesized environment map by synthesizing the first environment map and the second environment map.

An exemplary embodiment of the present invention also provides a method of providing AR, the method including extracting a first environment map corresponding to a location of a terminal; determining an expanded area enclosing the location of the terminal; extracting a second environment map corresponding the expanded area; and generating a synthesized environment map by synthesizing the first environment map and second environment map.

An exemplary embodiment of the present invention also provides an apparatus to provide Augmented Reality (AR), including: an environment map database to store a first environment map and a second environment map, the first environment map and the second environment map each having a center and environment data corresponding to the center; an extraction unit to extract the first environment map corresponding to a location of a terminal, to determine an expanded area enclosing the location of the terminal, and to extract the second environment map corresponding to the expanded area; and a synthesization unit to generate a synthesized environment map by synthesizing the first environment map and the second environment map.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "connected through" another element, it can be directly connected to the other element, or intervening elements may be present. In contrast, an element referred to as being "directly connected to" has no intervening elements present. Further, it will be understood that for the purposes of this disclosure, "at least one of", and similar language, will be interpreted to indicate any combination of the enumerated elements following the respective language, including combinations of multiples of the enumerated elements. For example, "at least one of X, Y, and Z" will be construed to indicate X only, Y only, Z only, or any combination of two or more items X, Y, and Z (e.g., XYZ, XZ, YZ).

Figure 1:
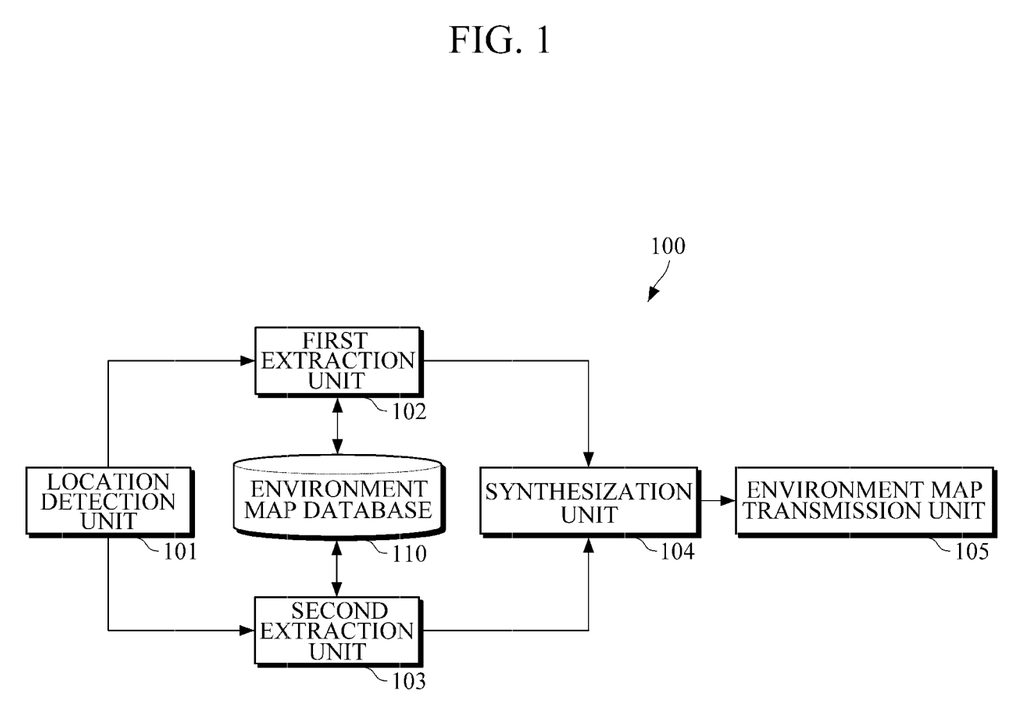
FIG. 1 is a diagram illustrating an apparatus to provide Augmented Reality (AR), according to an exemplary embodiment.

FIG. 1 is a diagram illustrating an apparatus to provide Augmented Reality (AR), according to an exemplary embodiment.

Referring to FIG. 1, apparatus 100 to provide AR may receive captured image data from a terminal (not shown) and may provide AR information corresponding to the received image data to the terminal. The apparatus 100 includes a location detection unit 101, a first extraction unit 102, a second extraction unit 103, a synthesization unit 104, an environment map transmission unit 105, and an environment map database 110. Although not shown, the first extraction unit 102 and the second extraction unit 103 may be combined as a single extraction unit performing the functions of both the first extraction unit 102 and the second extraction unit 103.

The environment map database 110 may store one or more environment maps of a region. For example, the term environment map indicates information corresponding to objects that are located in or near a particular region. By way of further example, an environment map may include a center of the environment map, image data of the center of the environment map, and objects that are viewed from the center of the environment map.

By way of example, the environment maps stored in the environment map database 110 may be cylinder maps, planar maps, spherical maps, or cubic maps. For convenience of description in the illustrated embodiments, the environment maps stored in the environment map database 110 will be described as cylinder maps. A cylinder map may be a 360-degree panorama view of a particular location, so that the particular location corresponds to a particular map's center.

The location detection unit 101 may detect the location of a terminal. The location detection unit 101 may receive global positioning system (GPS) coordinates of the terminal and an image captured by the terminal from the terminal, and may detect the location of the terminal based on the received GPS coordinates, the received image, or the combination thereof. The location detection unit 101 may determine one or more candidate locations based on the GPS coordinates of the terminal, and may select or set one of the candidate locations as the terminal location further based on an image captured by the terminal.

The first extraction unit 102 may extract a first environment map from the environment map database 110. The first environment map may be an environment map corresponding to the terminal location detected by the location detection unit 101.

Figure 2A:
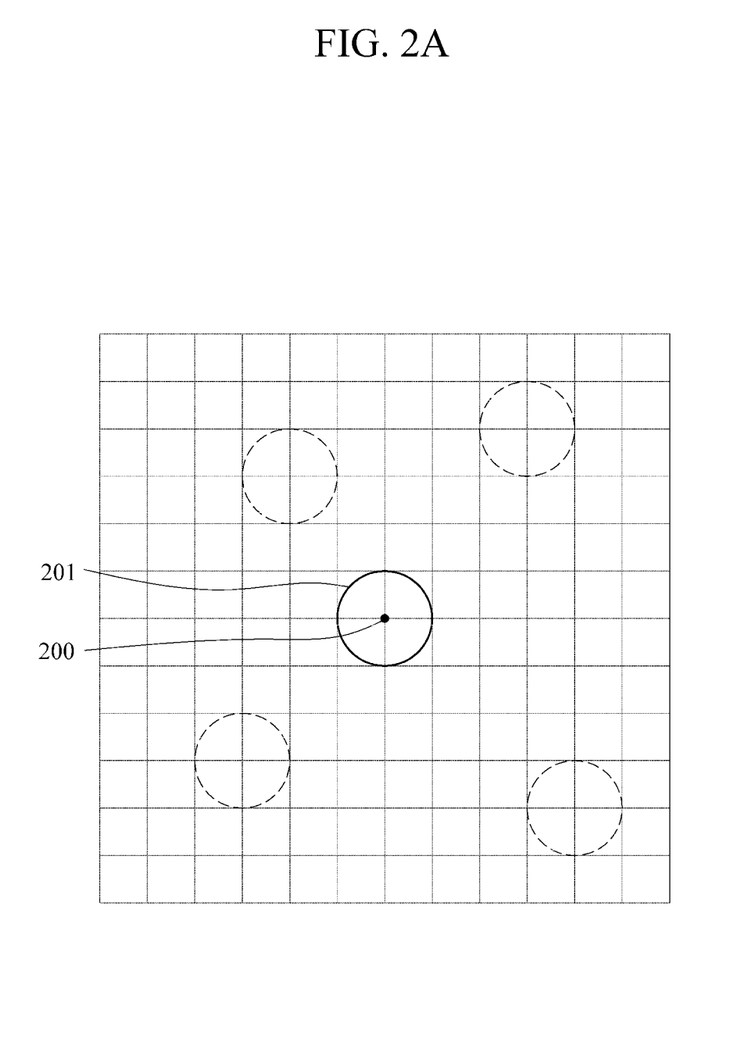
FIG. 2A is a diagram illustrating a first environment map according to an exemplary embodiment.

By way of example, referring to FIG. 1 and FIG. 2A, the first extraction unit 102 may extract an environment map 201. The center of environment map 201 may substantially coincide with a terminal location 200 detected by the location detection unit 101. However, the center of the environment map 201 may not exactly coincide with the exact terminal location 200. In other words, in response to the terminal location 200 being determined, an environment map whose center is closest to the terminal location 200 may be extracted from the environment map database 110 as the first environment map 201. Other criteria may be used to extract a selected environment map from the environment map database 110, such as where there may be more than one environment map that overlaps with the detected terminal location 200. The criteria may include a facing direction of the terminal when the image is captured, a geography or location details of the detected terminal location 200, and environmental preference information of a user, etc.

Referring again to FIG. 1, the second extraction unit 103 may extract one or more second environment maps 202 from the environment map database 110. The center of an extracted second environment map 202 may not coincide with the center of the extracted first environment map 201.

Figure 2B:
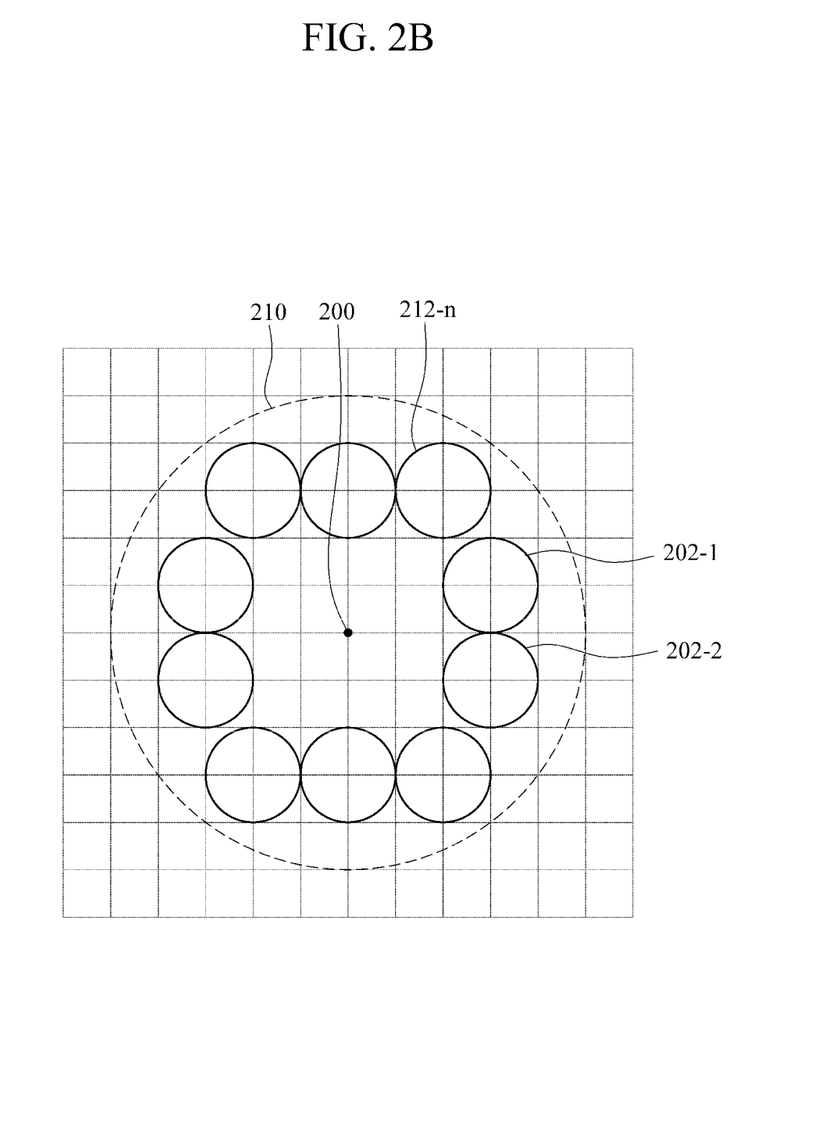
FIG. 2B is a diagram illustrating a second environment map according to an exemplary embodiment.

By way of example, referring to FIG. 1 and FIG. 2B, the second extraction unit 103 may determine an expanded area 210 by determining a circle whose center corresponds to the terminal location 200 and that has a specific radius. In this example, the second extraction unit 103 may extract at least one of n environment maps 201-1, 201-2, ..., 201-n that exist within the expanded area 210 as one or more second environment maps 202.

Referring again to FIG. 1, the synthesization unit 104 may generate a synthesized environment map by synthesizing the first environment map 201 extracted by the first extraction unit 102 and the second environment maps 202 extracted by the second extraction unit 103.

Figure 2C:
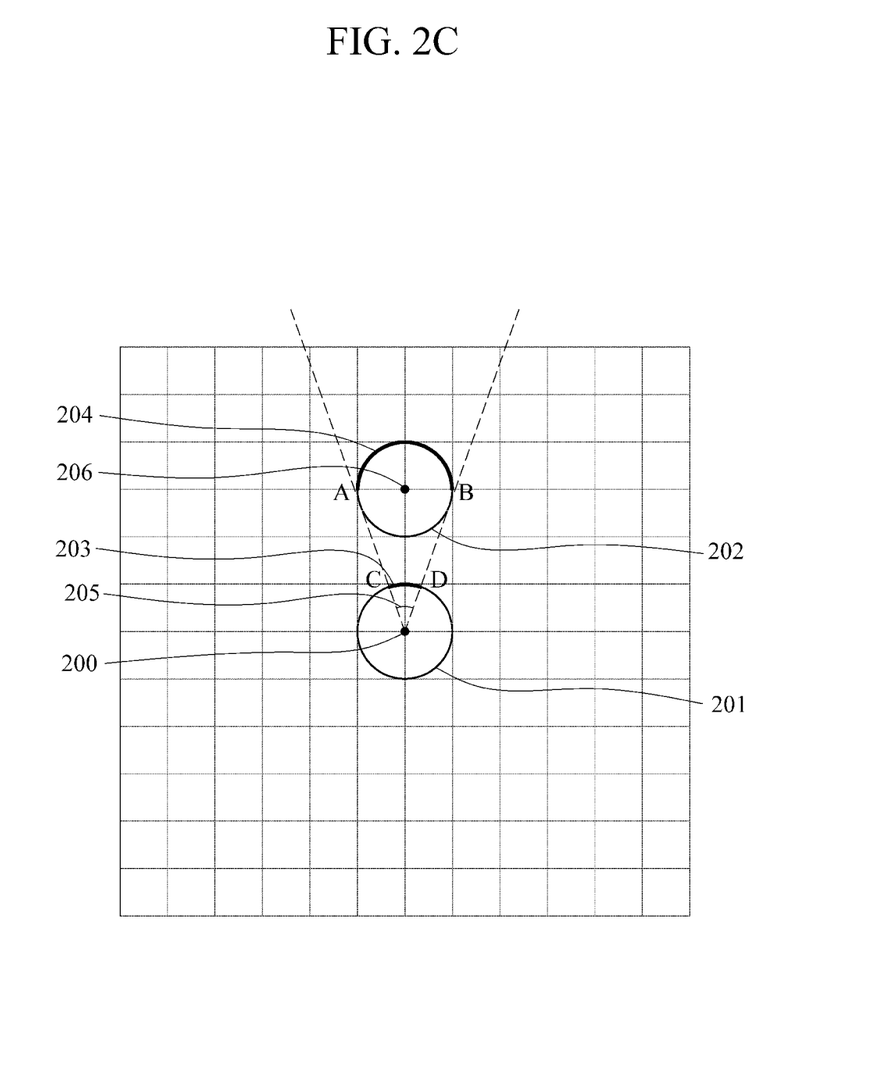
FIG. 2C is a diagram illustrating a synthesized environment map according to an exemplary embodiment.

By way of example, referring to FIG. 1 and FIG. 2C, the synthesization unit 104 may generate a synthesized environment map by mapping or projecting a synthesization target area 204 of a second environment map 202 onto a synthesization target area 203 of the first environment map 201. In this example, the synthesization unit 104 may adjust the size or transparency of the synthesization target area 203 and the synthesization target area 204 before the mapping or projecting of the synthesization target area 204 over the synthesization target area 203. For example, referring to FIG. 2C, a second object in the second environment map 202 may be located behind a first object in the first environment map 201 if viewed from the terminal location 200 or may be hidden from view from the terminal location 200 by the first object. In this example, the first environment map 201 and second environment map 202 may be synthesized after reducing the size of the second object and increasing the transparency of the first object.

Referring again to FIG. 1, the environment map transmission unit 105 may transmit a synthesized environment map generated by the synthesization unit 104 to the terminal so that the synthesized environment map can be displayed by the terminal. The synthesized map may be a map obtained by synthesizing a first environment map 201 and one or more second environment maps 202. Referring to again FIG. 2C, if a second object in the second environment map 202 is located behind a first object in the first environment map 201 and is hidden from view from the terminal location 200 by the first object in the first environment map 201, a synthesized environment map obtained by the first environment map 201 and the second environment map 202 may appear to be similar to an x-ray view. By way of example, in the synthesized environment map obtained by synthesizing the first environment map 201 and the second environment map 202, the first object in the first environment map 201 may be displayed semi-transparently so that the second object in the second environment map 202 can be seen.

Accordingly, it is possible to display both AR data corresponding to one or more objects that can be seen from a current location of a terminal and AR data corresponding to one or more objects that cannot be seen from the current location of the terminal. In addition, it is possible to reduce data transmission load by providing a synthesized environment map obtained by synthesizing one or more individual environment maps, instead of providing the individual environment maps separately.

FIG. 2A is a diagram illustrating a first environment map according to an exemplary embodiment. FIG. 2B is a diagram illustrating a second environment map according to an exemplary embodiment. FIG. 2C is a diagram illustrating a synthesized environment map according to an exemplary embodiment. Examples of extracting an environment map and synthesizing one or more environment maps into a synthesized environment map are described with reference to FIG. 2A, FIG. 2B and FIG. 2C.

Referring to FIG. 1 and FIG. 2A, the first extraction unit 102 may extract from the environment map database 110 an environment map whose center substantially coincides with the location of the terminal as the first environment map 201. For example, referring to FIG. 2A, reference numeral 200 indicates the detected location of the terminal and/or the center of the first environment map 201.

Referring to FIG. 1 and FIG. 2B, the second extraction unit 103 may determine a specific area including the terminal location 200 as the expanded area 210. By way of example, the expanded area 210 may be a circular area enclosing the terminal location 200. The size of the expanded area 210 may be determined by a user, or may vary depend on the size or quantity of AR data for each region. The second extraction unit 103 may extract at least one of the n environment maps 201-1, 201-2, . . . , 201-n that exist within the expanded area 210 as the second environment map 202.

The second extraction unit 103 may determine one or more expanded areas 210. By way of example, the second extraction unit 103 may determine a plurality of expanded areas 210 having different radiuses. In this example, the second extraction unit 103 may extract one or more second environment maps from an expanded area 210 having a radius of 1 as level-1 environment maps, and may extract one or more environment maps from an expanded area 210 having a radius of 2 as level-2 environment maps.

Referring to FIG. 1 and FIG. 2C, the synthesization unit 104 may synthesize the first environment map 201 and the second environment map 202. An example of synthesizing the first environment map 201 and the second environment map 202 is further described below.

Referring to FIG. 2C, the synthesization unit 104 may detect the synthesization target area 203 and synthesization target area 204 from the first environment map 201 and the second environment map 202, respectively. To detect the synthesization target area 203 and the synthesization target area 204, the synthesization unit 104 may draw two tangent lines (i.e., lines CA and DB) from the terminal location 200 or the center of the first environment map 201 to the second environment map 202, and may measure an angle 205 between lines CA and DB. The angle 205 may be referred to as a viewing angle of the terminal or the user at the terminal location 200. If the viewing angle 205 is determined, the synthesization unit 104 may detect parts of the first environment map 201 and the second environment map 202 corresponding to the viewing angle 205 as the synthesization target area 203 and the synthesization target area 204, respectively.

The synthesization unit 104 may synthesize the synthesization target area 203 and the synthesization target area 204. By way of example, the synthesization unit 104 may adjust the size and/or the transparency of the synthesization target area 203 and the synthesization target area 204, and may map or project the synthesization target area 204 onto the synthesization target area 203.

By way of example, the size and/or the transparency of the synthesization target area 203 and the synthesization target area 204 may be adjusted such that objects in the synthesized environment map appear as if they were displayed in an x-ray view.

The synthesization target area 203 and the synthesization target area 204 may be enlarged or reduced according to the distance between the terminal location 200 and a center 206 of the second environment map 202. By way of example, the synthesization target area 203 and the synthesization target area 204 may be adjusted such that objects that are further away from the user appear to be smaller than objects that are closer to the user.

The transparency of the synthesization target area 203 and the synthesization target area 204 may be adjusted according to the distance between the terminal location 200 and the center 206 of the second environment map 202. By way of example, a first object that is located near the terminal location 200 may be displayed semi-transparently such that a second object that is located behind the first object can be seen through the first object.

Synthesizing a single first environment map and a single second environment map has been described above with reference to FIG. 2C. Further, a first environment map and more than one second environment map with different levels may be synthesized as a synthesized environment map on a level-by-level basis. For example, two second environment maps may be arranged within a viewing angle of the terminal, but at different distances from the center of first environment map. In this example, degrees of transparency or sizes of objects included in the second environment maps may be set in the synthesized environment map according to relative distances from the center of first environment map.

Figure 3:
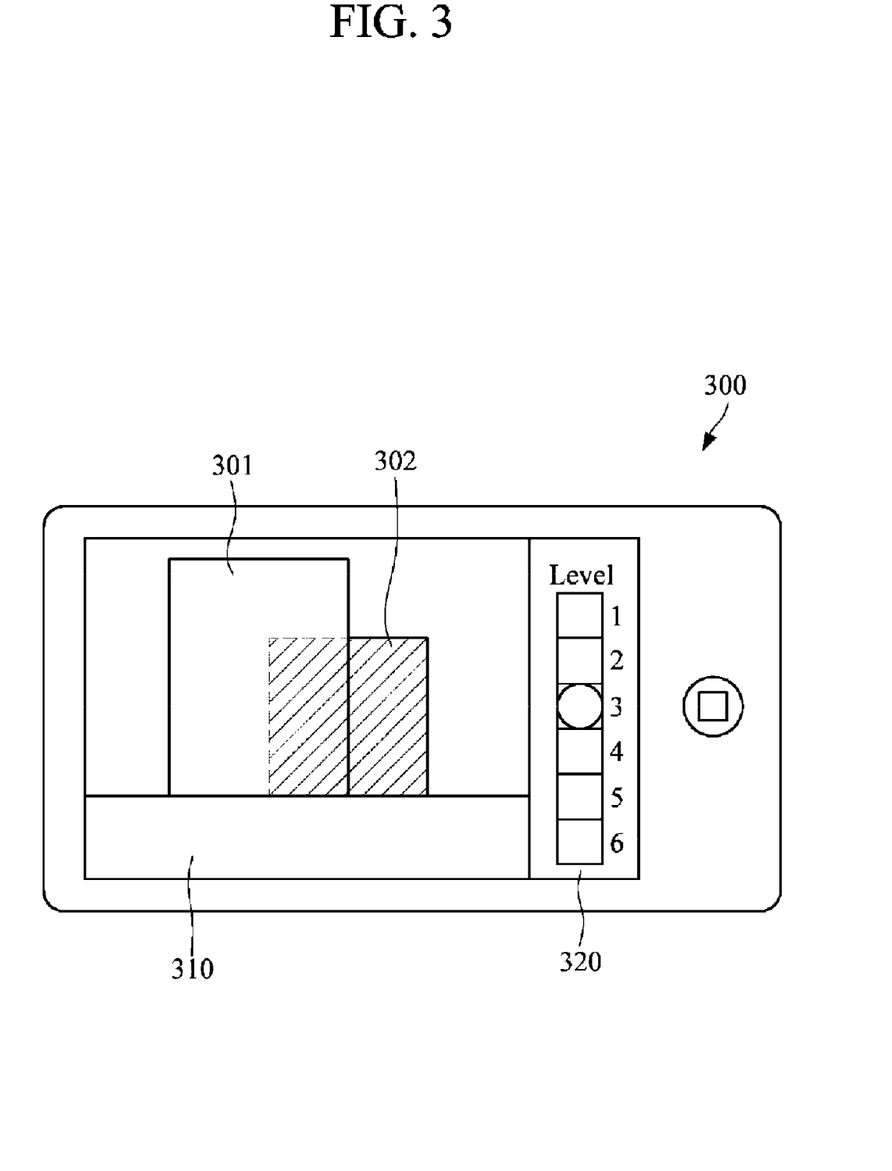
FIG. 3 is a diagram illustrating a terminal according to an exemplary embodiment.

FIG. 3 is a diagram illustrating a terminal according to an exemplary embodiment.

Referring to FIG. 3, terminal 300 includes an environment map display unit 310 and a depth level adjustment unit 320.

The environment map display unit 310 may display a synthesized environment map. By way of example, referring to FIG. 2C and FIG. 3, the synthesized environment map may be a map obtained by synthesizing the first environment map 201 and second environment map 202. The environment map display unit 310 may display both a first object 301 that is included in the first environment map 201 and a second object 302 that is included in the second environment map 202.

Referring to FIG. 2C and FIG. 3, the first object 301 may be an object that can be seen from the terminal location 200, and the second object 302 may be an object that is hidden from view from the terminal location 200 by the first object 301. By way of example, referring to FIG. 2C, the first object 301 may correspond to an object arranged along or inside arc CD 250, and the second object 302 may correspond to an object arranged along or inside arc AB 240.

Before the synthesization of the first environment map 201 and second environment map 202, the size and/or the transparency of the first object 301 and second object 302 may be adjusted. For example, the first object 301 may be displayed semi-transparently, and the second object 302 may be displayed behind the first object 301.

The depth level adjustment unit 302 may adjust the display state of the environment map display unit 310. For example, a user may adjust the size and/or the transparency of the first object 301 and second object 302 by touching on the depth level adjustment unit 302 to adjust the depth level. By way of example, as the depth level increases, the size of the second object 302, which is located behind the first object 301, may increase, and the transparency of the first object 301 may decrease.

Accordingly, a user may obtain AR information corresponding to an object that is located behind another object by adjusting the depth level using the depth level adjustment unit 302.

Figure 4:
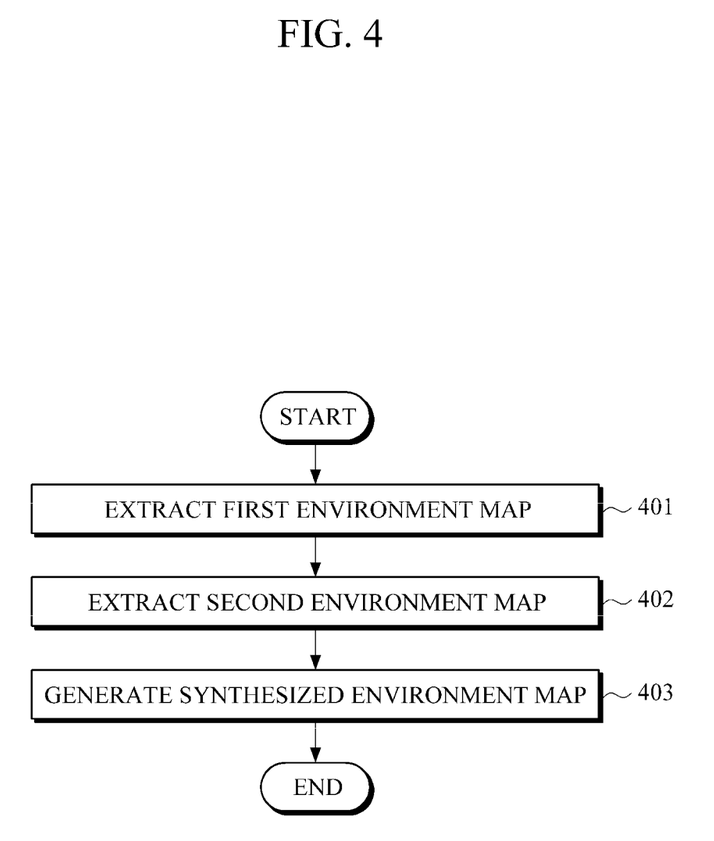
FIG. 4 is a flowchart illustrating a method for providing AR according to an exemplary embodiment.

FIG. 4 is a flowchart illustrating a method for providing AR according to an exemplary embodiment.

Referring to FIG. 4, in operation 401, a first environment map may be extracted. By way of example, the first environment map may be an environment map having a center region corresponding to the location of a terminal. By way of further example, referring to FIG. 1 and FIG. 2A, the first extraction unit 102 may extract the first environment map 201.

In operation 402, a second environment map may be extracted. By way of example, the second environment map may include one or more environment maps that exist within a specific area enclosing the location of the terminal. By way of further example, referring to FIG. 1 and FIG. 2B, the second extraction unit 102 may extract at least one of n environment maps 202-1, 202-2, ..., 202-n as the second environment map 202.

In operation 403, a synthesized environment map is generated. By way of example, part of the second environment map may be detected, the size and/or the transparency of the detected part may be adjusted, and the detected part may be mapped or projected onto the first environment map. By way of further example, referring to FIG. 1 and FIG. 2C, the synthesization unit 104 may detect the synthesization target area 203 and the synthesization target area 204 from the first environment map 201 and second environment map 202, respectively, may adjust the size and/or the transparency of the synthesization target area 203 or the synthesization target area 204, and may map or project the synthesization target area 204 onto the synthesization target area 203.

As described above, a synthesized environment map is obtained by synthesizing individual environment maps for a current terminal location. With the use of a synthesized environment map it may be possible to reduce data transmission load. In addition, it may be possible to obtain AR information corresponding to objects that are hidden from view from the current terminal location because images with different depth levels may be displayed with characteristics adjusted according to the current terminal location.

The processes, functions, methods, and/or software described herein may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to provide Augmented Reality (AR), comprising:
    a first extraction unit to extract a first environment map corresponding to a location of a terminal;
    a second extraction unit to determine an expanded area enclosing the location of the terminal and to extract a second environment map included in the expanded area; and
    a synthesization unit to generate a synthesized environment map by synthesizing the first environment map and the second environment map,
    wherein the second environment map is smaller than the expanded area.

2. The apparatus of claim 1, further comprising:
    an environment map database to store a plurality of environment maps each having a center and environment data corresponding to the center, the first environment map and the second environment map extracted from among the plurality of environment maps.

3. The apparatus of claim 2, wherein a center of the first environment map corresponds to the location of the terminal.

4. The apparatus of claim 2, wherein the expanded area has a center that corresponds to the location of the terminal, and the second environment map is located within the expanded area.

5. The apparatus of claim 2, wherein the synthesization unit is further configured to detect a synthesization target area from the first environment map and the second environment map based on the location of the terminal, a location of a center of the second environment map, and a viewing angle with respect to the second environment map from the location of the terminal.

6. The apparatus of claim 5, wherein the synthesization unit is further configured to adjust a size and/or a transparency of the synthesization target areas of the first environment map and the second environment map based on a distance between the location of the terminal and the center of the second environment map.

7. The apparatus of claim 6, wherein the synthesization unit is further configured to project the synthesization target area of the second environment map onto the synthesization target area of the first environment map.

8. The apparatus of claim 1, further comprising:
    a location detection unit to detect the location of the terminal based on at least one of location information received from the terminal and image data captured by the terminal.

9. The apparatus of claim 1, further comprising:
    an environment map transmission unit to transmit the synthesized environment map to the terminal.

10. The apparatus of claim 1, wherein the first environment map and the second environment map include at least one of a cylinder map, a planar map, a spherical map, and a cubic map.

11. The apparatus of claim 1, wherein the second extraction unit extracts a plurality of second environment maps corresponding to the expanded area, and selects at least one of the plurality of second environment maps to generate the synthesized environment map.

12. The apparatus of claim 1, wherein a center of the first environment map does not coincide with a center of the second environment map.

13. A method for providing Augmented Reality (AR), comprising:
   extracting a first environment map corresponding to a location of a terminal;
   determining an expanded area enclosing the location of the terminal;
   extracting a second environment map included in the expanded area; and
   generating a synthesized environment map by synthesizing the first environment map and the second environment map,
   wherein the second environment map is smaller than the expanded area.

14. An apparatus to provide Augmented Reality (AR), comprising:
   an environment map database to store a first environment map and a second environment map, the first environment map and the second environment map each having a center and environment data corresponding to the center;
   an extraction unit to extract the first environment map corresponding to a location of a terminal, to determine an expanded area enclosing the location of the terminal, and to extract the second environment map included in the expanded area; and
   a synthesization unit to generate a synthesized environment map by synthesizing the first environment map and the second environment map,
   wherein the second environment map is smaller than the expanded area.

15. The apparatus of claim 14, wherein a center of the first environment map corresponds to the location of the terminal.

16. The apparatus of claim 14, wherein the expanded area has a center that corresponds to the location of the terminal, and a center of the second environment map is located within the expanded area.

17. The apparatus of claim 14, wherein the synthesization unit is further configured to detect a synthesization target area from the first environment map and the second environment map based on the location of the terminal, a location of a center of the second environment map, and a viewing angle with respect to the second environment map from the location of the terminal.

18. The apparatus of claim 17, wherein the synthesization unit is further configured to adjust a size and/or a transparency of the synthesization target areas of the first environment map and the second environment map based on a distance between the location of the terminal and the center of the second environment map.

19. The apparatus of claim 18, wherein the synthesization unit is further configured to project the synthesization target area of the second environment map onto the synthesization target area of the first environment map.

20. The apparatus of claim 14, further comprising:
   a location detection unit to detect the location of the terminal based on at least one of location information received from the terminal and image data captured by the terminal.

21. The apparatus of claim 14, further comprising:
   an environment map transmission unit to transmit the synthesized environment map to the terminal.

22. The apparatus of claim 14, wherein the first environment map and the second environment map include at least one of a cylinder map, a planar map, a spherical map, and a cubic map.

23. The apparatus of claim 14, wherein the extraction unit extracts a plurality of second environment maps corresponding to the expanded area from the environment map database, and selects at least one of the plurality of second environment maps to generate the synthesized environment map.

* * * * *